United States Patent [19]

Sakai et al.

[11] Patent Number: 4,538,060
[45] Date of Patent: Aug. 27, 1985

[54] OPTICAL READING APPARATUS HAVING A READING SENSOR OF ELECTRONIC SCANNING TYPE

[75] Inventors: Toshiyasu Sakai; Masahiro Hara, both of Kariya; Nobuyuki Teraura, Tokai, all of Japan

[73] Assignee: Nippondenso Co., Ltd., Kariya, Japan

[21] Appl. No.: 499,406

[22] Filed: May 31, 1983

[30] Foreign Application Priority Data

May 31, 1982 [JP] Japan ................................. 57-93375

[51] Int. Cl.³ ............................................ G06K 7/10
[52] U.S. Cl. .................................... 235/472; 235/466
[58] Field of Search ........................ 235/462, 466, 472

[56] References Cited
U.S. PATENT DOCUMENTS 4,488,678 12/1984 Hara ................................. 235/462 X Primary Examiner—Harold I. Pitts
Attorney, Agent, or Firm—Cushman, Darby & Cushman

[57] ABSTRACT

In an optical reading apparatus having a reading sensor for converting optically readable information into an electrical signal by electronically scanning an image of optical information, such as a bar code, a detector is provided to detect the intensity of light incident on an information label on which the information is provided. Data indicative of the light intensity is used to determine a subsequent scanning period in such a manner that the scanning period of the reading sensor is shortened when the light intensity increases or vice versa. Since the decrease in the scanning period results in lower output voltage from the reading sensor, undesirable saturation in circuitry following the reading sensor is effectively prevented, providing stable operation of the reading sensor, such as a bar code reader.

14 Claims, 4 Drawing Figures

OPTICAL READING APPARATUS HAVING A READING SENSOR OF ELECTRONIC SCANNING TYPE

BACKGROUND OF THE INVENTION

This invention relates generally to optical reading apparatus, such as a bar code reader, arranged to read coded information by a reading sensor of electronic scanning type.

When reading optically readable information such as a bar code printed on a bar code label, by means of a bar code reader, suitable light is incident on the label to detect reflected light, where the reflected light is transmitted through a lens to image the pattern of the bar code on a sensor which produces an electrical signal indicative of the information from the bar code. However, there are various kinds of recording media carrying optically readable information, such as bar codes. For instance, taking an example of bar code labels, it is to be noted that the reflection coefficient of bar code labels has a variation due to the difference in color, material or due to stain thereon. Since bar code readers detect the information of the bar code from the difference in reflection coefficient between dark (black) bars and light spaces (white bars), the amplitude of the output signal from the reading sensor used in the reader is small when the reflection coefficient is low. On the other hand, when reading a bar code printed on a high reflection coefficient label, the output signal exhibits a large amplitude. In this way, the output signal level changes due to the difference in reflection coefficient of the bar code labels, and therefore, this results in unstable reading because it is difficult to shape the waveform of an electrical signal whose amplitude varies throughout labels.

In addition, since bar code labels are usually illuminated by a light source built in a bar code reader, the intensity of the reflected light changes when the intensity of the incident light changes. Furthermore, when external light is also incident on the label, the intensity of the reflected light is affected even if the intensity of the light from the built-in light source is kept constant. Especially, when a high-intensity external light is applied to the label, the output signal from an amplifier and other circuits following the reading sensor is apt to be saturated resulting in unreadable condition.

SUMMARY OF THE INVENTION

The present invention has been developed in order to remove the above-described drawbacks inherent to the conventional optical reading apparatus.

It is, therefore, an object of the present invention to provide an optical reading apparatus which is capable of reading optically readable information even if an information label receives high-intensity light.

According to a feature of the present invention the scanning period of the sensor is controlled in accordance with the intensity of light reflected at an information lable so that the reading operation is stably carried out. To this end, means for detecting the intensity of reflected light and means for controlling the scanning period on the basis of the detected intensity are provided. Namely, the frequency of scanning clock pulse signal is controlled so as to stably read optical information.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
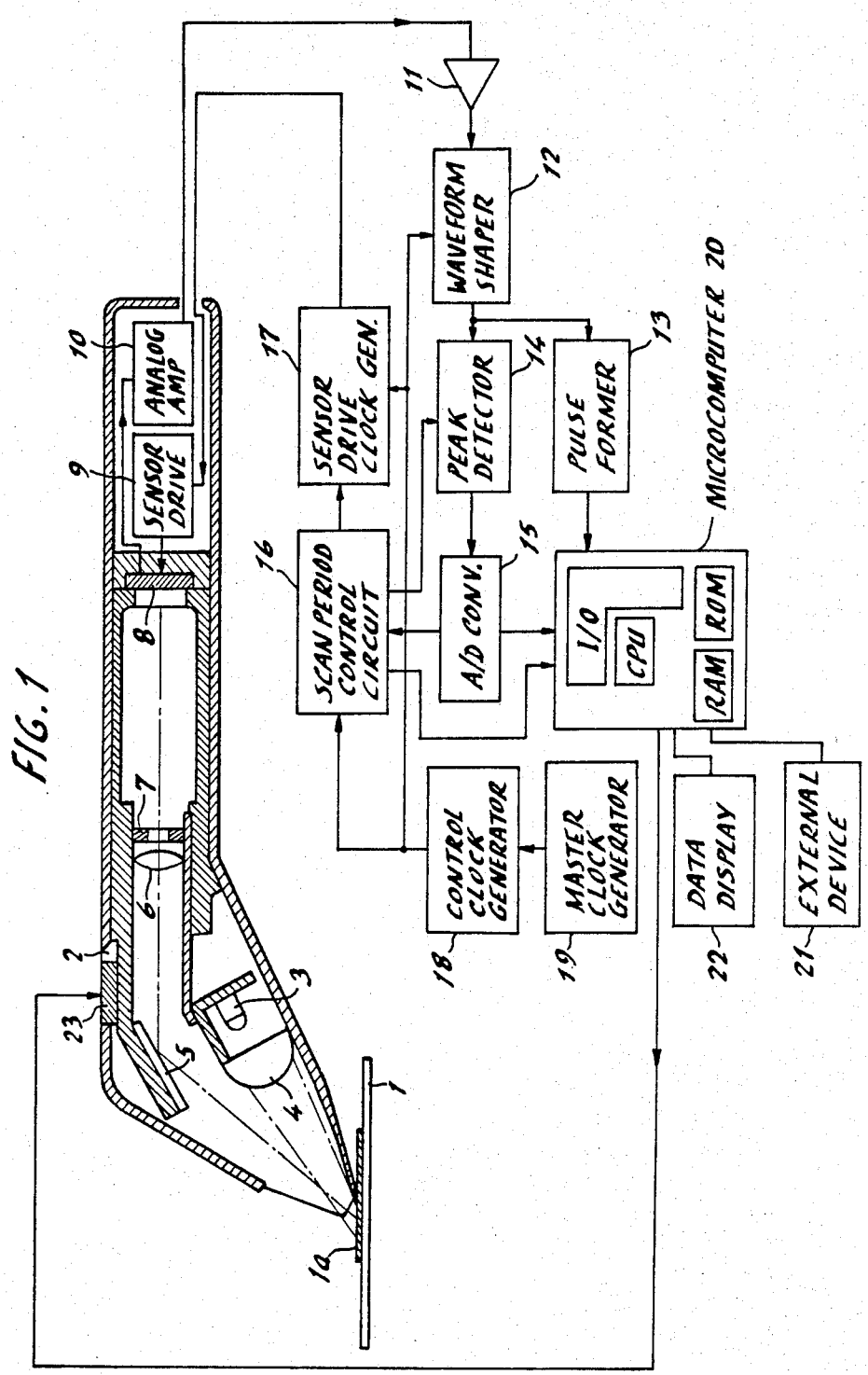
FIG. 1 is a schematic diagram of an embodiment of a bar code reader according to the present invention.

Referring now to FIG. 1, a schematic diagram of an embodiment of an optical reading apparatus according to the present invention is shown. The reference 1 is an optically readable information lable, such as a bar code label on which a bar code 1a having black bars and white bars (light spaces) are printed as a light and shade pattern. Although the present invention is not limited to a bar code reader, the embodiment will be described as a bar code reader. The reference 2 indicates a casing of a hand-held bar code reader. The bar code reader comprises within the casing 2 a light source 3 having a plurality of lamps for illuminating the bar code label 1, and a semi-cylindrical lens 4 for condensing the light from the light source 3 so that the light is incident on the bar code label 1 after being condensed. The reference 5 is a reflecting mirror used for reflecting reflected light from the bar code label 1 in a predetermined direction, i.e. a direction toward a reading sensor 8, and the reflected light from the reflecting mirror 5 is transmitted through a condenser lens 6 and a diaphragm member 7 having an elongate slit arranged so that its longitudinal direction is perpendicular to the reading direction which is normal to the parallel bars, to the reading sensor 8 where an image of the bar code 1a to be scanned is imaged thereon.

The reading sensor 8 uses a one-dimentional image sensor which converts the image on the scanning line into an electrical signal by electronic scanning operation. A dot-dash line in FIG. 1 indicates the locus of light in the optical system. The reference 9 is a driving circuit for the reading sensor 8. Necessary clock pulses for driving the reading sensor 8 are produced by the driving circuit 9 by changing clock pulses from a reading sensor drive clock generator 17, and are applied to the reading sensor 8. The reference 10 is an analog amplifier which amplifies an electrical signal from the reading sensor 8, obtained by scanning.

The reference 23 is an alerting device, such as a buzzer or an LED, provided to the bar code reader casing 2 for giving information to a user as will be described later.

The reading sensor 8 comprises a linear image sensor having photodiodes of 1024 bits or pixels. The reading sensor 8 operates in response to a driving signal which drives a read-out MOS switch shift register of several phases.

Figure 2:
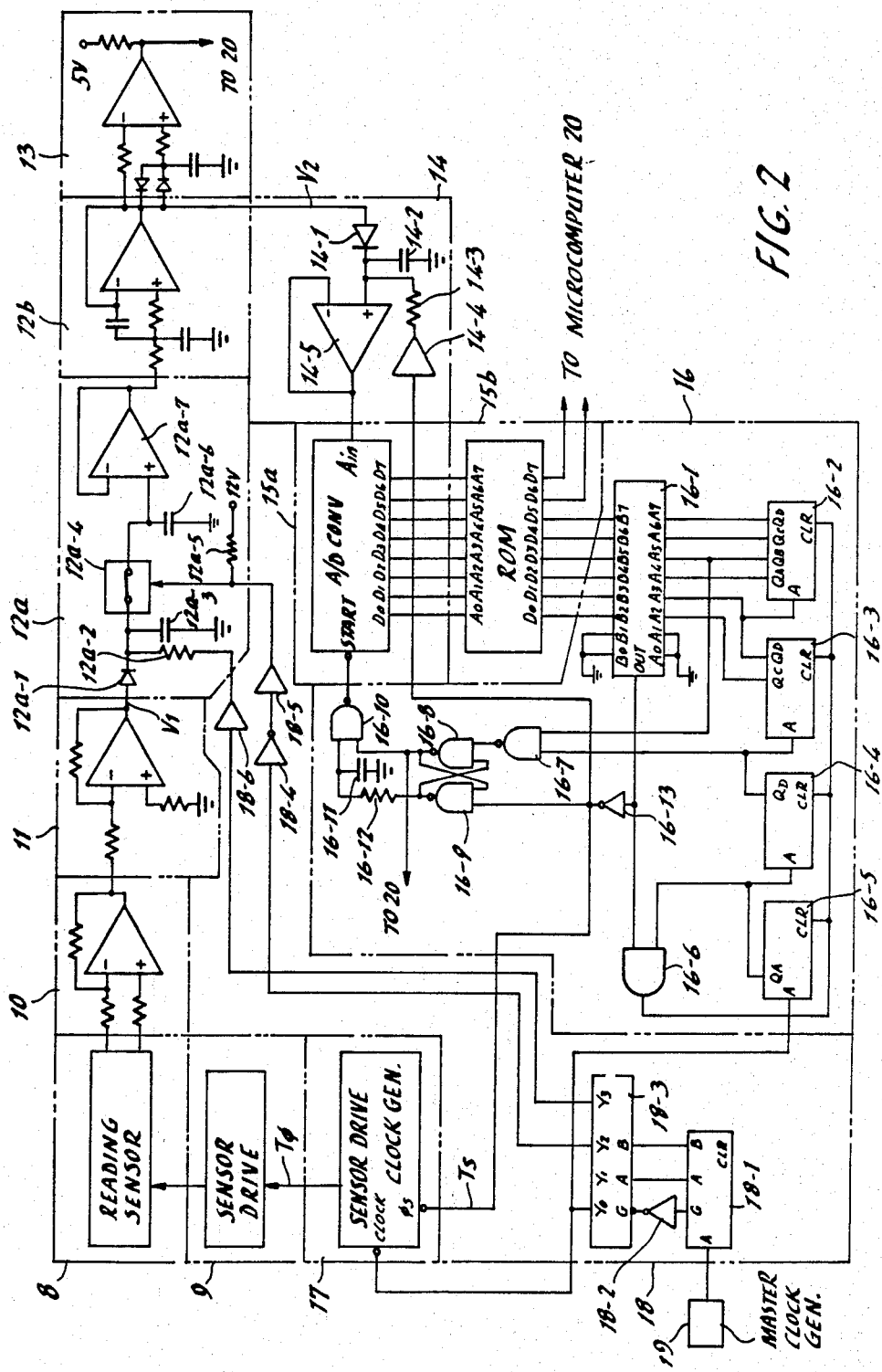
FIG. 2 is a circuit diagram of a main part of FIG. 1.

FIG. 2 shows a detailed circuit diagram of a main part of the optical reading apparatus of FIG. 1. The reading sensor drive clock generator 17 produces several phases of transfer clocks for the read-out MOS switch shift register of the reading sensor 8, and the reading sensor 8 is arranged to start scanning for reading information in response to the leading edge of a read-start signal Ts. The output signal from the reading sensor 8 is read out in synchronism with the leading edge of an input clock pulse of the reading sensor drive clock pulse generator 17.

A video signal obtained in the reading sensor 8 as the result of conversion is amplified by an analog amplifier 10 and also by another amplifier 11, and the waveform of the signal from the latter amplifier 11 is shaped by a waveform shaping circuit 12. The above-mentioned analog amplifier 10 and the driving circuit 9 are both installed in the casing 2 of the hand-held bar code reader. The waveform shaping circuit 12 is an envelope detector so that envelope detection is effected to convert the video signal into an envelope-detected video signal. The waveform shaping circuit 12 comprises a sample-and-hold circuit 12a for converting the output signal from the amplifier 11 into a continuous signal, and a low pass filter 12b for smoothing the output signal waveform. The output signal from the waveform shaping circuit 12 is converted into a binary signal of "1" and "0" in a following pulse former 13. The output signal from the waveform shaping circuit 12 is also fed to a peak detector 14 which comprises a diode 14-1, a capacitor 14-2, a discharging resistor 14-3, a carging-resistor-control driver 14-4, and an operational amplifier 14-5. The operational amplifier 14-4 is used as a voltage follower circuit.

The reference 15 is an A/D (analog-to-digital) converting circuit comprising an A/D converter 15a and a ROM (read-only memory). The A/D converter 14a converts its input analog signal from an input terminal Ain to a digital signal outputted from output terminals $D_0$ through $D_7$ in synchronism with the trailing edge of an A/D conversion-start signal fed to its terminal START. The ROM 15b is used to select a most suitable scanning period. In detail, the ROM 15b is responsive to the output digital signal from the A/D converter 15a at its input terminals $A_0$ through $A_7$ so as to deliver an output signal from its output terminals $D_0$ through $D_5$ to a reading sensor scanning period control circuit 16. The ROM 15b is also arranged to produce another output signal which is fed to a microcomputer (not shown) via output terminals $D_6$ and $D_7$.

The reading sensor scanning period control circuit 16 comprises a digital comparator 16-1, counter circuitry having four counters 16-2 to 16-5, an AND gate 16-6, NAND gates 16-7 to 16-10, a capacitor 16-11, a resistor 16-12, and an inverter 16-13. The counter circuitry 16-2 to 16-5 are arranged to count the number of clock pulses from a control clock generator 18 one by one. The digital comparator 16-1 is arranged to compare the output data from the ROM 15b with the count of the counter circuitry 16-2 to 16-5. The counters 16-2 to 16-5 are reset to zero by a reset signal from the AND gate 16-6 in response to a signal indicative of coincidence from the digital comparator 16-1 and a signal which appears one clock pulse after the coincidence. Furthermore, the gates 16-7 through 16-10, the capacitor 16-10 and the resistor 16-11 are arranged such that the A/D conversion-start signal is produced when the count of the counter circuitry 16-2 through 16-5 reaches "1056", namely, when the output signals QB and QD of the counters 16-2 and 16-4 assumes logic "1".

The control clock generator 18 comprises a counter 18-1, an inverter 18-2, and a 2-to-4 decoder 18-3. An output signal from an output terminal $Y_0$ of the decoder 18-3 is used to result in increment of the clock signal for the reading sensor drive clock generator 17 and in increment of the count of the counter circuitry 16-2 to 16-5. Another output signal from an output terminal $Y_2$ is used to close an analog switch 12a-4 of the sample-and-hold circuit 12, while a further output signal from an output terminal $Y_3$ is used to discharge a capacitor 12a-3 via a resistor 12a-2. The references 18-5 and 18-6 indicate amplifiers, and the reference 18-4, an inverter. The control clock generator 18 is responsive to a clock pulse train from a master clock generator 19 which produces given frequency clock pulses.

Turning to FIG. 1, the reference 20 is a microcomputer used to process the detected optical information in accordance with a predetermined method so as to output digital data indicative of detected optical information. The microcomputer 20 comprises a central processing unit (CPU), a random-access memory (RAM), a read-only memory (ROM), and an input-output device (I/O) and is arranged to decode the width of each detected bar. The alerting device 23 may be a piezo-electric buzzer 23, and is used to inform the operator of the completion of reading in response to a signal from the microcomputer 20. The references 21 and 22 are respectively an external device for further processing the detected data and a data display device for visually indicating the detected optical information.

The circuit arrangement of FIGS. 1 and 2 operate as follows. In order to read the bar code 1a printed on the bar code label 1, the head portion of the hand-held bar code reader is directed at the bar code label 1 as shown in FIG. 1 with the light source 3 being energized. The light rays from the light source 3 are condensed by the lens 4 to illuminate the bar code label 1 so that the intensity of light reflected at black bars is lower than that of reflected light from white bars. The reflected light is transmitted through the reflecting mirror 5, the lens 6 and the diaphragm member 7 so that the pattern of the bar code 1a is imaged on a scanning line on the reading sensor 8. Since the elongate slit made in the diaphragm member 7 is perpendicular to the reading line, the focal depth is made sufficiently deep to avoide unfocussing, and a sufficient amount of light can pass therethrough to ensure accurate reading by the reading sensor 8.

The reading sensor 8 performs electronic scanning in receipt of the clock pulse signal from the driving circuit 9 so that the black and white bars imaged on the scanning line thereof are converted into corresponding electrical signals. The clock pulses from the driving circuit 9 are repeatedly fed to the reading sensor 8 so that electronic scanning is repeatedly effected until reading is completed. In detail, each of the diode array of the reading sensor 8 converts optical information into an electrical signal in such a manner that data in the form of charge stored in each photodiode is read out in synchronism with the clock from the reading sensor drive clock generator 17 so that output data is derived in series as the output signal of the reading sensor 8. Namely, each photodiode is initialized by a repetition signal from the reading sensor drive period control circuit 16 so that reading out is repeatedly effected. The output signal from the reading sensor 8 is amplified by the analog amplifier 10, and then fed via the amplifier 11 to the waveform shaping circuit 12.

Figure 3:
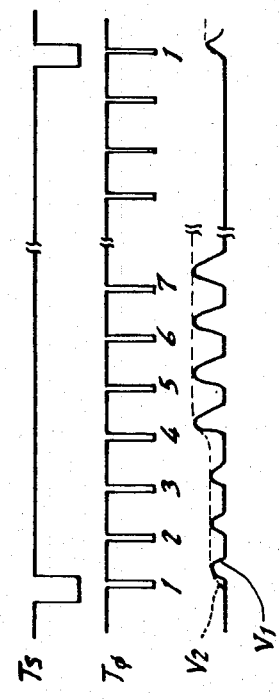
FIGS. 3 and 4 are waveform charts useful for understanding the operation of the circuit of FIG. 2.

The waveform of the output signal from the amplifier 11 is shown in FIG. 3 as $V_1$. In FIG. 3, the reference Ts indicates the above-mentioned read-start signal, and $T\phi$ indicates the clock pulse train applied to the reading sensor 8. Namely, the reading sensor 8 scans the image thereon at an interval defined between two consecutive read-start pulses Ts in such a manner that the data of each diode is read out in synchronism with the clock pulse $T\phi$.

The peak voltage of the signal from the diode array of the reading sensor 8 is stored in a capacitor 12-3 of the sample-and-hold circuit 12, and this stored charge is tranferred to another capacitor 12a-6 by closing the analog switch 12a-4 at a timing of the signal from the output terminal $Y_2$ of the decoder 18-3. The charge remaining in the capacitor 12a-3 is discharged through the resistor 12a-2 at a timing of the signal from the output terminal $Y_3$ of the decoder 18-3 so as to prepare for subsequent detection of next-coming peak. An operational amplifier 12a-7 of the sample-and-hold circuit 12 is used as a voltage follower so that the output thereof will follow the voltage across the capacitor 12a-6.

The low pass filter 12b is responsive to the output voltage of the operational amplifier 12a-7 for shaping the stepwise waveform in such a manner that adjacent peaks are smoothed. A dotted curve $V_2$ indicates the waveform of the output signal from the low pass filter 12b. Since the peaks are smoothed, the amplitude of output signal $V_2$ from the low pass filter corresponds and indicates the black and white bars of the bar code label 1.

On the other hand, the reading sensor scanning period control circuit 16 operates as follows. Since the count of the counter circuitry 16-2 to 16-15 is increased by counting the number of clock pulses from the control clock generator 18, the data from the ROM is continuously compared with the count by the digital comparator 16-1. The digital comparator 16-1 produces a low level output signal when its two input data are different from another, and a high level output signal when they coincide with each other. This high level output signal, which is referred to as a coincidence signal hereafter, is used to initialize the counters 16-2 to 16-5. Namely, when an output signal from an output terminal QA of the counter 16-5 is present at the time the coincidence signal is outputted, the AND gate 16-6 produces a high level output signal which is fed to CLAER terminals of the counters 16-2 to 16-5 to reset the count to zero. As soon as initialization is effected, since the data from the ROM 15b is not equal to the count anymore, the output signal from the digital comparator 16-1 turns to low level.

The coincidence signal is inverted by the inverter 16-13, and this inverted signal is fed to the reading sensor drive clock generator 17 as the above-mentioned read-start signal Ts. As a result, reading from the reading sensor 8 is started from the first photodiode of the diode array. The inverted coincidence signal from the inverter 16-13 is also fed to an amplifier 14-4 so that a peak detection capacitor 14-2 of the peak detector 14 is discharged via a resistor 14-3 connected to the amplifier 14-4. The inverted coincidence signal is further fed to an R-S flip-flop comprising the NAND gates 16-8 and 16-9 to reset the same so that the output signal of the NAND gate 16-9 turns high and the output signal of the other NAND 16-8 turns low.

After this, the count of the counter circuitry 16-2 to 16-5 increases one by one in synchronism with the signal from the output terminal $Y_0$ of the decoder 18-3 of the control clock generator 18, while signals of individual pixels of the photodiode array are read out one after another. Therefore, the count of the counter circuitry 16-2 to 16-5 represents the order or position of a photodiode which is now accessed to read out information therefrom.

At an instant after the completion of reading from 1024 photodiodes, namely, at the time 1056 has been counted in the illustrated embodiment, the output signal of the NAND gate 16-7 turns low. As a result, the R-S flip-flop is triggered so that the output signal of the NAND gate 16-8 turns high and the output signal of the NAND gate 16-9 turns low. Since the resistor 16-10 and the capacitor 16-11 constitute a delay circuit, the NAND gate 16-10 responsive to the output signals of the R-S flip-flop turns low for an interval defined by the time constant of the delay circuit. In detail, when the R-S flip-flop is triggered as described in the above, one input signal level of the NAND gate 16-10 turns high because the output signal from the NAND gate 16-8 is high, and the other input signal level of the NAND gate 16-10 remains high due to the delay. The low level signal from the NAND gate 16-10 is fed to the terminal START of the A/D converter 15a as the A/D conversion-start signal. Thus, the analog input signal fed to the input terminal Ain of the A/D converter 15a is converted into a digital signal of 8 bits which are derived from the output terminals $D_0$ to $D_7$.

The above-mentioned analog signal fed to the A/D converter 15a is produced in the peak detector 14 as follows. Namely, the output signal from the low pass filter 12b of the waveform shaping circuit 12 is fed via a diode 14-1 to a capacitor 14-2 so that a peak voltage is detected. Since the capacitor 14-2 is repeatedly discharged in response to the coincidence signal from the digital comparator 16-1, a peak voltage within one reading period is detected and stored in the capacitor 14-2. This voltage across the capacitor 14-2 is fed via a buffer amplifier 14-5 to the above-mentioned input terminal Ain of the A/D converter 15a.

As best seen in another waveform chart of FIG. 4, the peak voltage from the peak detector 14 varies as a function of the intensity of light incident on the bar code label 1 and the scanning period as follows:

$$V_{PN} K_1 \cdot i \cdot ts_{N-1} \tag{1}$$

wherein $V_{PN}$ is the peak voltage resulted from $N^{th}$ scanning:

$K_1$ is a constant;

i is intensity of incident light; and $ts_{N-1}$ is the scanning period of $(N-1)^{th}$ scanning.

The peak voltage $V_{PN}$ is used to determine a most suitable scanning period ts by reading out prewritten data with an appropriate address being designated. In other words, the peak voltage $V_{PN}$ is converted into a scanning period ts. The relationship between the peak voltage $V_{PN}$ and the scanning period ts can be expressed by:

$$ts_n = f(V_{PN}) \tag{2}$$

wherein $ts_N$ is the scanning period of the $N^{th}$ scanning;

$V_{PN}$ is the peak value resulted from the $N^{th}$ scanning.

If the values of the scanning period ts prestored in the ROM 15b is selected so as to satisfy the following equation;

$$t_{sN} = K_2/V_{PN} \tag{3}$$

wherein
K$_2$ is a constant;
Eq. (3) can be written as follows by substituting Eq. (1):

$$V_{PN} = K_1 \cdot i \cdot K_2/V_{PN-1} \tag{4}$$

Here, since the scanning period ts is short relative to the variation speed of the light intensity, $V_{PN}$ can be put as the following equation:

$$V_{PN} = V_{PN-1} \tag{5}$$

From Eq. (5) the following relationship is obtained when a suitable value is selected for the constant K$_2$ so that the peak voltage $V_{PN}$ converges to a given value:

$$V_{PN} = \sqrt{K_1 \cdot K_2 \cdot i} \tag{6}$$

Since $\sqrt{K_1 \cdot K_2}$ is a constant, which can be put as K, $V_{PN}$ can be given by:

$$V_{PN} = K\sqrt{i} \tag{7}$$

Eq. (7) shows that the peak voltage $V_{PN}$ is in proportion to the square root of the incident light intensity i. Namely, even if the intensity of the light incident on the bar code label 1 suddenly increases, the peak voltage $V_{PN}$ increases at a rate equal to the square root of the light intensity. Consequently, it is possible to derive a peak voltage $V_{PN}$ which varies to a relatively small extent when compared with the variation of the incident light intensity.

From the above, it will be understood that various data of scanning period ts is stored in the ROM 15b in the form of a map so that a most suitable scanning period ts is selected in accordance with the peak voltage $V_{PN}$. The selected and thus read out scanning period data is then compared with the count of the counter circuitry 16-2 to 16-5 as described in the above. This means that the timing of the coincidence signal from the digital comparator 16-1 canges in accordance with the peak voltage such that the scanning period ts becomes shorter and shorter as the peak voltage increases. On the other hand, when the peak voltage lowers, the scanning period ts is lengthened. The reading sensor 8 is thus driven with such a variable scanning period so that the peak voltage from the peak detector 14 converges to a given value.

Two output terminals D6 and D7 of the ROM 15b are connected to the microcomputer 20 of FIG. 1 for giving information indicative of the presence or absence of the bar code label 1. Namely, in the presence of the bar code label 1 the peak voltage $V_P$ from the peak detector 14 exceeds a predetermined value, resulting in relatively small digital data from the ROM 15b, and this small digital value is used in the microcomputer 20 to determine whether an information label is present or not. The output terminal of the NAND gate 16-8 of the R-S flip-flop is also connected to the microcomputer 20 for giving information indicating whether all the photodiodes, i.e. 1024 photodiodes, of the reading sensor 8 have been scanned to read out data therefrom. These information pieces will be used in the microcomputer 20 for processing binary data from the pulse former 13.

Figure 4:
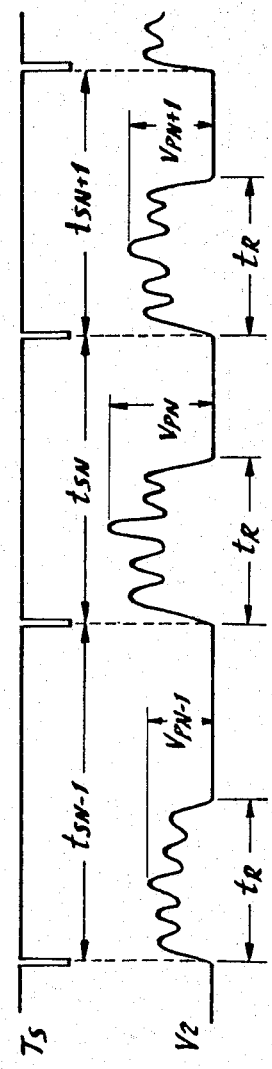

The scanning period data ts derived from the output terminals D$_0$ to D$_5$ of the ROM 15b is selected so that the smallest scanning period ts is always greater than a period t$_R$ required for A/D conversion as shown in FIG. 4.

In the above embodiment, although a 1024-bit image sensor of MOS type is used as the reading sensor 8, other type image sensors, such as CCD (charge-coupled-device) image sensor may be used instead. When such a different type image sensor is used, although the way of reading out is different from that of the above embodiment, the scanning time or the charge-storing time for the photodiodes can be controlled in the same manner as in the above-described embodiment to obtaine similar result.

Furthermore, the number of bits of the reading sensor 8 is not limited to 1024, and therefore, image sensors of other bit number may be used. In addition, the image sensor 8 is not limited to a one-dimention or linear type. Namely, two-dimentsion or area image sensor may also be used as long as its charge-storing time or scanning period can be controlled.

In the above-described embodiment, although the scanning period or timing is controlled by comparing data, which is a function of the output voltage of the reading sensor 8, with a count of the counter circuitry 16-2 to 16-5, a microcomputer may be used to effect similar operation. Namely, the scanning period control circuit 16 and the ROM 15b may be replaced with a microcomputer having a timer so that the A/D converted signal is fed to the microcomputer for computing a subsequent scanning period, which will be set in the timer so that a signal having a time length determined by the timer will be fed to the reading sensor drive clock generator 17 as the read-start signal Ts. Thus, the ROM 15b as well as the counter circuitry 16-2 to 16-5 can be omitted when such operation is executed by the microcomputer. This microcomputer is not needed to be provided in addition to the microcomputer 20. Namely, the microcomputer 20 of FIG. 1, which is used to process the binary signal indicative of the black and white bars, may be utilized with the program being changed to execute the above operation.

In the above-described embodiment, the data in the ROM 15b indicative of the scanning period ts may be any values as long as the scanning period ts is lengthened when the voltage from the reading sensor 8 decreases, and is shortened when the voltage increases. Accordingly, the value of a plurality of scanning period data ts may be arranged such that the scanning period ts consecutively or stepwisely changes.

Moreover, although the peak voltage from the peak detector 14 is used to detect the intensity of the incident light for controlling the scanning period ts in the above-described embodiment, an average voltage may be used in place of such a peak voltage. In this case, an average voltage detector may be employed in place of the peak detector 14.

In the above-described embodiment, the output signal from the reading sensor 8 is used to control the scanning period. However, a photodetector or light intensity sensor may be separately provided for deriving a sinnal indicative of the intensity of reflected light.

From the foregoing description, it will be understood that the optical reading apparatus according to the present invention is capable of reading optically readable information even if the information label receives and reflects a large amount of light inasmuch as the scanning period of the reading sensor is controlled so that satuation in electrical processing circuitry is effectively prevented. This enables an optical information reading apparatus to stably operate, providing accurate information or data from the information label.

The above-described embodiments are just examples of the present invention, and therefore, it will be apparent for those skilled in the art that many modifications and variations may be made without departing from the spirit of the present invention.

What is claimed is:

1. An optical reading apparatus for converting optically readable information into an electrical signal by means of a reading sensor of electronic scanning type, comprising:
   first means for detecting the intensity of light incident on an information label on which said optically readable information is provided; and
   second means responsive to said first means for controlling the scanning period of said reading sensor.

2. An optical reading apparatus as claimed in claim 1, wherein said first means comprises circuitry responsive to an output signal from said reading sensor.

3. An optical reading apparatus as claimed in claim 2, wherein said first means comprises a sample-and-hold circuit responsive to said output signal from said reading sensor; a low pass filter responsive to an output signal from said sample-and-hold circuit; and a peak detector responsive to said output signal from said low pass filter.

4. An optical reading apparatus as claimed in claim 3, wherein said sample-and-hold circuit comprises:
   a first capacitor arranged to be cyclically charged with a voltage proportional to the output signal from said reading sensor;
   an analog switch arranged to open and close in response to a clock pulse signal;
   a second capacitor arranged such that the voltage across said first capacitor is intermittently transmitted thereto via said analog switch; and
   a voltage follower responsive to the output voltage across said second capacitor.

5. An optical reading apparatus as claimed in claim 3, wherein said peak detector comprises:
   a peak hold circuit having a diode and a capacitor; and
   a buffer amplifier responsive to a voltage across said capacitor.

6. An optical reading apparatus as claimed in claim 2, further comprising:
   an analog-to-digital converter responsive to said circuitry; and
   a read-only memory the data of which is arranged to be selectively read out in accordance with digital data from said analog-to-digital converter.

7. An optical reading apparatus as claimed in claim 3, further comprising:
   an analog-to-digital converter responsive to said peak detector; and
   a read-only memory the data of which is arranged to be selectively read out in accordance with digital data from said analog-to-digital converter.

8. An optical reading apparatus as claimed in claim 6, wherein said second means comprises:
   counter circuitry for counting the number of clock pulses; and
   a digital comparator for comparing the data from said read-only memory with the count of said counter circuitry so as to produce a coincidence signal when the data are equal to each other.

9. An optical reading apparatus as claimed in claim 7, wherein said second means comprises:
   counter circuitry for counting the number of clock pulses; and
   a digital comparator for comparing the data from said read-only memory with the count of said counter circuitry so as to produce a coincidence signal when the data are equal to each other.

10. An optical reading apparatus as claimed in claim 8, wherein said analog-to-digital converter is arrannged to be controlled by the count of said counter circuitry and said coincidence signal.

11. An optical reading apparatus as claimed in claim 9, wherein said analog-to-digital converter is arranged to be controlled by the count of said counter circuitry and said coincidence signal.

12. An optical reading apparatus as claimed in claim 7, wherein said data prestored in said read-only memory is selected so as to satisfy the following equation;

$$ts_N = K_2/V_{PN}$$

wherein
$ts_N$ is a scanning period of an $N^{th}$ scanning;
$K_2$ is a constant;
$V_{PN}$ is a peak voltage from said peak detector, resulted from the $N^{th}$ scanning.

13. An optical reading apparatus as claimed in claim 1, wherein said reading sensor is installed in a hand-held casing.

14. An optical reading apparatus as claimed in claim 1, wherein said reading sensor is installed in a hand-held casing in which a light source is mounted to illuminate said information label.

* * * * *